(No Model.)
G. R. HOLLINGSWORTH.
BRIDLE APPLIANCE FOR SUBDUING HORSES.
No. 474,739. Patented May 10, 1892.
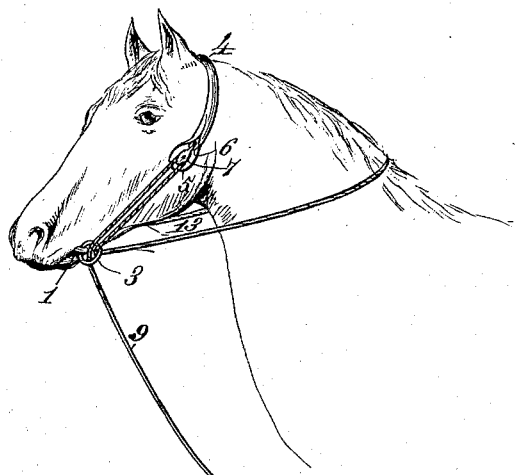
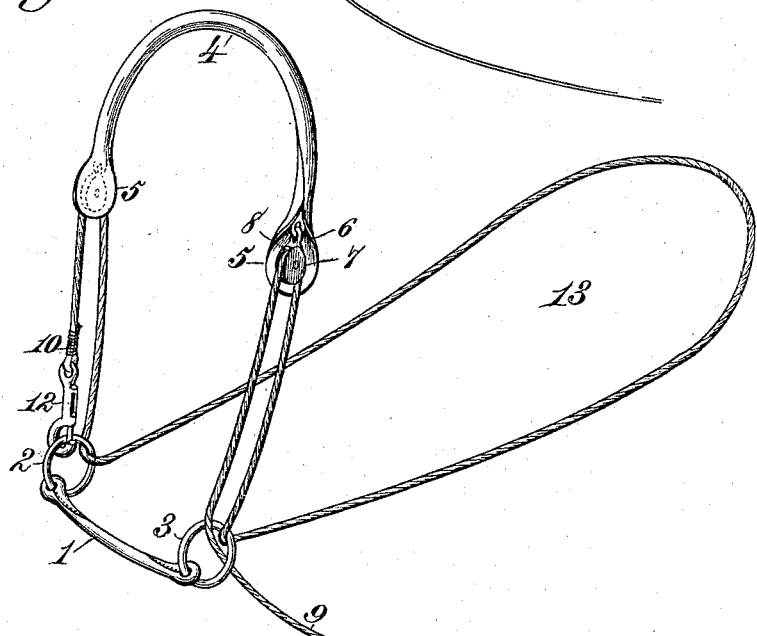

UNITED STATES PATENT OFFICE.

GIBSON R. HOLLINGSWORTH, OF HAGERSTOWN, MARYLAND.

BRIDLE APPLIANCE FOR SUBDUING HORSES.

SPECIFICATION forming part of Letters Patent No. 474,739, dated May 10, 1892.

Application filed March 5, 1892. Serial No. 423,892. (No model.)

*To all whom it may concern:*

Be it known that I, GIBSON R. HOLLINGSWORTH, a citizen of the United States, residing at Hagerstown, in the county of Washington and State of Maryland, have invented new and useful Improvements in Bridles or Appliances for Subduing Horses, of which the following is a specification.

This invention has for its object to provide new and improved means for breaking animals, conquering their refractory tempers, and rendering them submissive and docile for such purposes as shoeing, harnessing, grooming, and examining the mouth, head, and other parts, the construction of the appliance being such that an equalized pressure can be instantly applied to the ends of a bit or mouth-piece and the ends of a head-band to subdue the animal without liability of chafing, sawing, burning, or cutting the lips or mouth, or otherwise injuring any part of the body, while the attendant can stand at a distance and control the pressure at will.

To accomplish this object my invention consists in the combination, with a bit having rings at its ends and a yoke-shaped head-band adapted to bear on an animal's head behind the ears, of a line formed into a brace-loop to rest on the animal's neck back of the head-band, passing through both bit-rings and engaged with the ends of the head-band, so that by pulling the free end of the line the opposite ends of the bit and head-band are uniformly drawn toward each other.

The invention also consists in the combination, with a head-band having a pulley at each end and adapted to bear on an animal's head behind the ears and a bit or mouth-piece having rings at its ends, of a line formed into a brace-loop to rest on the animal's neck back of the head-band, connected at one end with one bit-ring and loosely engaging the pulleys and the other bit-ring, so that by pulling the free end of the line the opposite ends of the head-band are uniformly drawn toward each other with an equalized pressure.

The invention is illustrated by the accompanying drawings, in which—

Figure 1 is a perspective view showing my invention applied to the head of an animal, and Fig. 2 is a detail perspective view of the break bridle or appliance.

In order to enable my invention to be clearly understood, I will now describe the same in detail, referring to the drawings, wherein—

The numeral 1 indicates a bit or mouth-piece having metal bit-rings 2 and 3 at its ends and preferably composed of leather or similar material, which is not likely to injure the mouth of the animal.

The head-band 4 is preferably composed of a leather roll approximately circular in cross-section and enlarged or spread at its extremities to form flat guard-pieces 5, which rest against the cheeks of the animal. At the outer side of each guard-piece is loosely suspended, as at 6, a pulley-frame 7, provided with a grooved pulley 8. The pulley-frames are connected with the head-band in any suitable manner, which will permit them to swing slightly at their point of attachment to render the motion of the line, hereinafter explained, free and easy. The line 9 may be of any material sufficiently strong to suit the conditions required, but is preferably composed of a hemp rope about the size of an ordinary clothes-line, and at one extremity 10 is provided with a snap-hook 12 for detachably engaging it with the bit-ring 2, from which latter the line extends to and round the pulley 8 on the end of the head-band, which is directly above the bit-ring 2. The line is then carried downward through the bit-ring 2 and is formed into a brace-loop 13, and is thence carried through the bit-ring 3 to and round the pulley 8 on the end of the head-band, which is above the bit-ring 3, and is then carried through the latter, so that the free end portion of any suitable length can be pulled and released. The head-band 4 is adapted to rest on the animal's head directly behind the ears, and the brace-loop 13 is adapted to rest on the animal's neck at some distance back of the head-band, while the bit or mouthpiece is inserted into the mouth of the animal, so that by pulling the free end portion of the line the opposite ends of the bit or mouthpiece and of the head-band are uniformly drawn toward each other with an equalized pressure to cause the head-band to press on the tender point of the animal directly behind the ears, which is a punishment that soon brings the animal into subjection. When the free end portion of the line is pulled, the strain is transmitted to the brace-loop 13, and consequently both ends of the bit or mouthpiece, as well as both ends of the head-band, have an equalized pressure applied thereto, which is very important, in that it entirely avoids sawing, cutting, chafing, or burning of the animal's mouth.

The single line arranged as described and shown is very useful and convenient, particularly for shoeing horses, in that the horse-shoer can pass from foot to foot or round the animal with the free end portion of the line tucked in his pocket or thrown over his shoulder, so that both hands can be utilized for the work in hand, while the line will be in a convenient position for a quick pull in case of an emergency, or, if occasion demands, the application of pressure to quiet the animal and prevent restiveness, kicking, biting, or jumping.

The appliance is effective for many purposes which require the conquering of a refractory temper to render an animal submissive, but is specially desirable where animals, owing to viciousness, are difficult to shoe, harness, groom, feed, or examine.

I have practically demonstrated that one or two applications of pressure by pulling the free end portion of the line are sufficient to render a very refractory animal so docile that it will follow the attendant and be obedient thereafter. A horse is quick to learn, and by releasing the pressure the instant the animal becomes quiet or moves toward the attendant the object is attained, as the animal becomes aware that the punishment ceases when submissive, and will soon learn to move toward the end of the line to relieve itself of the pressure, in which event further trouble is unlikely to occur. I do not confine myself to the employment of a pulley at each end of the head-band, as the line may otherwise engage the head-band at one end thereof; but a pulley should be used at the opposite end of the head-band and the single line must move through both bit-rings, for otherwise an equalized pressure on the bit and head-piece cannot be obtained, and without this equalized pressure the lips or mouth of the animal will be chafed, burned, or cut, which is very objectionable in a break bridle or appliance. The brace-loop acts similar to a martingale to prevent the animal throwing his head or rearing, and is in the nature of a lever, by which the head can be held steady.

My invention differs materially from a pair of drawing-lines, each having an independent block-and-tackle connection with a bit and a part of the headstall. In my invention a single line is employed and one end is free, while the other end is attached, and by running this line as explained a single pull on the free end imparts an equalized pressure on the bit and head-band.

Having thus described my invention, what I claim is—

1. The combination, with a bit having rings at its ends and a yoke-shaped head-band having bearings at its ends and adapted to bear on an animal's head behind the ears, of a continuous line formed into a brace-loop to rest on the animal's neck back of the head-band, passing through both bit-rings and engaged with the bearings at the ends of the head-band, so that by pulling the free end of the line the opposite ends of the bit and head-band are uniformly drawn toward each other, substantially as described.

2. The combination, with a head-band having a pulley at each end and adapted to bear on an animal's head behind the ears and a bit or mouthpiece having rings at its ends, of a continuous line formed into a brace-loop to rest on the animal's neck back of the head-band, connected at one end with one bit-ring and loosely engaging the pulleys and the other bit-ring, so that by pulling the free end of the line the opposite ends of the bit and the head-band are uniformly drawn toward each other, substantially as described.

In testimony whereof I have hereunto set my hand and affixed my seal in presence of two subscribing witnesses.

G. R. HOLLINGSWORTH. [L. S.]

Witnesses:
    GEO. W. REA,
    J. A. RUTHERFORD.